United States Patent [19]

Pipella et al.

[11] Patent Number: 5,068,787
[45] Date of Patent: Nov. 26, 1991

[54] MEANS AND METHODS OF TABULATING TIME AND TASK PERFORMANCES

[75] Inventors: Lawrence S. Pipella, Scottsdale; Logan M. Fanjoy, Mesa; Rodger L. Lawless; James E. Davies, both of Chandler, all of Ariz.

[73] Assignee: Analysist Development Group, Inc., Scottsdale, Ariz.

[21] Appl. No.: 492,544

[22] Filed: Mar. 13, 1990

[51] Int. Cl.⁵ .............................................. G06F 15/21
[52] U.S. Cl. .................................. 364/406; 364/401; 364/705.06; 364/709.09
[58] Field of Search .................. 364/401, 406, 705.06, 364/708, 709.09, 709.12; 340/711, 309.15

[56] References Cited

U.S. PATENT DOCUMENTS

| | | | |
|---|---|---|---|
| D. 243,250 | 2/1977 | Hazama | 364/708 X |
| 3,922,649 | 11/1975 | Thome | 340/309.15 X |
| 4,143,417 | 3/1979 | Wald et al. | 364/900 |
| 4,164,038 | 8/1979 | Nachtigal | 364/406 X |
| 4,195,220 | 3/1980 | Bristol et al. | 368/46 X |
| 4,273,032 | 9/1988 | Uehara et al. | 364/709.04 |
| 4,358,777 | 11/1982 | Bille | 346/82 |
| 4,454,414 | 6/1984 | Benton | 364/406 X |
| 4,460,965 | 7/1984 | Trehn et al. | 364/467 |
| 4,536,646 | 8/1985 | Adams et al. | 235/377 |
| 4,549,264 | 10/1985 | Carroll et al. | 364/406 |
| 4,625,276 | 11/1986 | Benton et al. | 364/408 |
| 4,634,845 | 1/1987 | Hale et al. | 235/380 |
| 4,654,818 | 3/1987 | Wetterau, Jr. | 364/900 |
| 4,830,328 | 5/1989 | Takach, Jr. et al. | 248/639 |
| 4,842,531 | 6/1989 | Takemura | 439/165 |
| 4,852,033 | 7/1989 | Saitou | 364/708 |

OTHER PUBLICATIONS

"As Time Goes By", *Washington Post*, (Washington Business), Jul. 10, 1989, p. 22.

*Primary Examiner*—Dale M. Shaw
*Assistant Examiner*—David Huntley

[57] ABSTRACT

A system for analyzing job cost, worker efficiency and the like including portable modules for receiving and collecting work time data; a collection station optically interfaceable with the portable modules to receive and store the collected work time data from the modules; and a transmitter for delivering stored work time data from a collection station to a host computer.

7 Claims, 3 Drawing Sheets

Microfiche Appendix Included
(2 Microfiche, 195 Pages)

MEANS AND METHODS OF TABULATING TIME AND TASK PERFORMANCES

A microfiche appendix containing the source code of the software portion of this invention referred to herein comprising two (2) microfiche of one hundred ninety-five (95) frames is incorporated herein by this reference hereto and is filed herewith. A portion of this disclosure of this patent document contains material subject to copyright protection. The copyright owner has no objection to the facsimile reproduction by anyone of the patent document or the patent disclosure as it appears in the United States Patent and Trademark patent file or records and otherwise reserves all copyright rights whatsoever.

INTRODUCTION

The present invention relates generally to record keeping and more particularly to means and methods for tabulating time and task performances to make a record of a worker's daily activity related to time expenditures for use in preparing meaningful time and labor management studies.

BACKGROUND OF THE INVENTION

Typically, time and management studies have heretofore required time-consuming methods involving hand written entries, computer terminal entries, bar-code station inputs and magnetic card inputs before a meaningful correlation can be obtained. Each of these methods required the record-keeping individual to identify many parameters including the time of day, the start and finish of a designated task, identification of interruptions caused by other jobs arising in mid-stream, and so on. Often, more time was wasted locating the designated tabulation sheet and recording data thereon, or in obtaining access to a computer/bar-code terminal than the actual job required. In addition, the prior art methods generated a high support cost for computer resources and a highly labor intensive effort to translate the data and subsequent data entry.

As technology developed, the need to develop means to create an accurate record of an individual worker's daily activities in a multi-task environment became apparent, particularly if efficiency and cost effectiveness were to be maximized in a multi-task environment.

There are significant personnel reasons for having such a means available because it allows promotions and increases to be predicated upon a solid performance basis and eliminates supervisor preference or prejudice from the equation used to define such advancements.

The present invention is directed to solving the problems of the prior art by providing efficient automated means and methods for tabulating the time and the duration of a multitude of tasks, both general and specific, performed by an individual during the course of the workday for the purpose of time and labor management studies.

BRIEF SUMMARY OF THE INVENTION

The present invention relates to means and methods for automatically keeping track of the time of day, time increments, application, function, function changes, job code and data format all in a readily portable battery powered device. Further the device of the present invention is easily transported by the individual worker on his/her person and requires as its only input the function or application changes as they occur. The status of the device is readily displayable on an alpha-numeric display for immediate review. Further, the device of the present invention tabulates and stores this data at the time of an occurrence and the duration of time between sequential entries. Subsequently, the daily data created thereby is downloaded into a compatible collection station for storage and/or for manipulation by other devices.

The present invention is predicated upon the development of a novel and unique system and methods of using the same which facilitate the collection and tabulation of an individual's daily activities with exceptionally high resolution and accuracy, while automatically notating date, time and duration. Further, the system of the present invention contains means for data acquisition, transmission and confirmation to the collection station which does not require any physical contact.

Accordingly, it is the principal object of the present invention to provide improved means and methods whereby an individual worker may create a record of his/her workday activities including, but not limited to time of day, type of event, duration of event, and the like, simply by entering into the device each new event as it occurs during the day, which the device will electronically record in a prespecified format having appropriate preprogrammed attributes included automatically.

Another object of the present invention is to provide a new and unique record retention system having a non-mechanical data-link established between the tabulation device and the companion collection station, the non-mechanical data-link employing optical, infrared, acoustic, ultrasonic and like non-physical means to transmit and compare data and operational commands.

Still another object of the present invention is to provide a unique data tabulator having a self-contained solar panel to provide power during the limited duration of data-link.

A further object of the present invention is to provide a recording device having an easily manipulated keypad to facilitate the direct entry of data or information thereinto which data and information is idiosyncratic to the individual worker to whom the device is assigned.

These and still further objects as shall hereinafter appear are readily fulfilled by the present invention in a remarkably unexpected fashion as will be readily discerned from the following detailed description of the preferred embodiments thereof, especially when read in conjunction with the accompanying drawings in which like parts bear like numerals throughout the several views.

DESCRIPTION OF THE PREFERRED EMBODIMENTS

The peripheral data collection system of the present invention is an electronic system used to record and report labor related data. Physically the system consists of two main components, namely a Peripheral Data Collector card ("PDC card"), and a collection station.

The PDC card consists of a hinged foldable module, each half of the module approximating the size of a conventional credit card, that is, about 9 mm by 6.5 mm. In use, the card, when unfolded, presents a lower half containing a keyboard, and an upper half which presents a display as will be hereinafter described in detail.

In operation, the user will be prompted with entries related to labor tracking, such as department identification (ID), operator ID, and Job/Function ID (herein "input data"). The PDC card then automatically tracks start and stop times for such input data. Periodically the card is folded and placed into the collection station so that the tracked data may be extracted from the card.

Electronically, the PDC card consists of four subsystems. The first or "Subsystem One" comprises a microcontroller, such for example as the MC68HC11E9 produced by the Motorola Corporation. The microcontroller is the "brains" of the PDC.

The second subsystem or "Subsystem Two" is the user interface and consists of a keyboard and a low power liquid crystal display ("LCD").

Subsystem Three comprises a power source, which, for all subsystems except the interface subsystem, is a suitable battery.

Subsystem Four provides the interface between the PDC card and the collection station ("collector") and comprises a first and a second infrared emitter-detector setup, the transmitter from one set up and the detector from the other setup being disposed on the PDC card while the detector from the first setup and the emitter from the second setup being disposed on the collector. Thus, these setups provide bidirectional communication between the PDC card and the collector. Subsystem Four is powered by a solar cell, which is activated when the PDC card is disposed within the collection station as will hereafter be described.

The collection station is a suitable processor based design (such as the MC68HC11E9 made by Motorola). The processor is selected to provide adequate memory to hold the contents of several PDC cards. The collection station further includes infrared circuitry for communication with PDC cards, and serial circuitry to transmit data received from the PDC cards to a remote host computer for further processing. The several systems and subsystems will now be described in detail.

Figure 1:
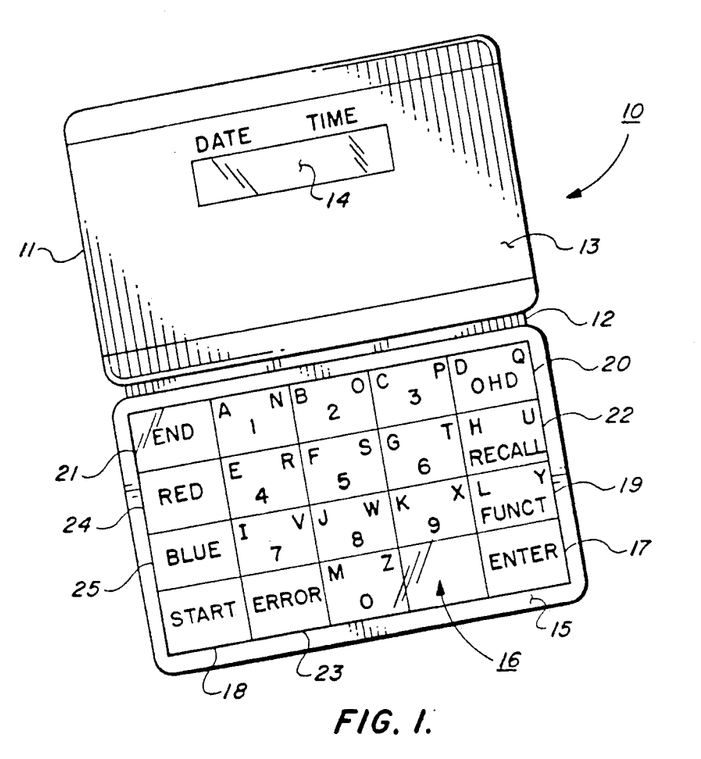
FIG. 1 is an isometric interior view of a tabulation device embodying the present invention, shown in the open position.

Referring to the drawing, and particularly to FIG. 1, one embodiment of an automatic tabulation device prepared according to the present invention is identified by the general reference 10. Each tabulation device or PDC card 10 comprises a dual segmented flat folding rectangular housing 11, joined at its midline by a suitable hinge 12. Centrally positioned on the upper interior surface 13 of housing 11 is an alpha-numeric display 14. Centrally positioned on the lower interior surface 15 of housing 11 is keypad assembly 16 containing a plurality of keypads. Keypad assembly 16 contains, at a minimum, nine key keypad. Of these, one keypad 17 provides the function command "ENTER", one keypad 18 provides the function command "START", one keypad 19 provides the function command "FUNCTION", one keypad 20 provides the function command "OVERHEAD", one keypad 21 provides the function command "END", one keypad 22 provides the function command "RECALL", one keypad 23 provides the function command "ERROR", one keypad 24 provides the function command "TOGGLE RED", and one keypad 25 provides the function command "TOGGLE BLUE". The several functions enumerated above will be hereinafter described in detail.

Figure 2:
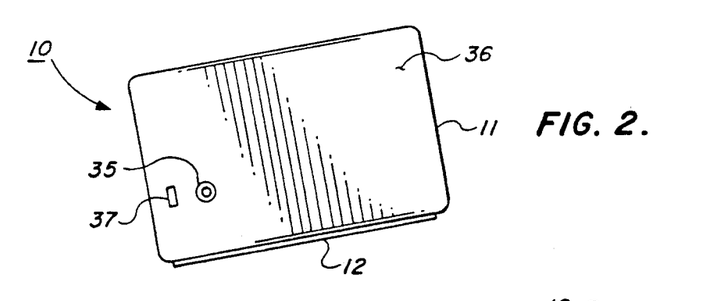
FIG. 2 is an isometric view of the device of FIG. 1 showing the bottom exterior surface in the closed position.
Figure 3:
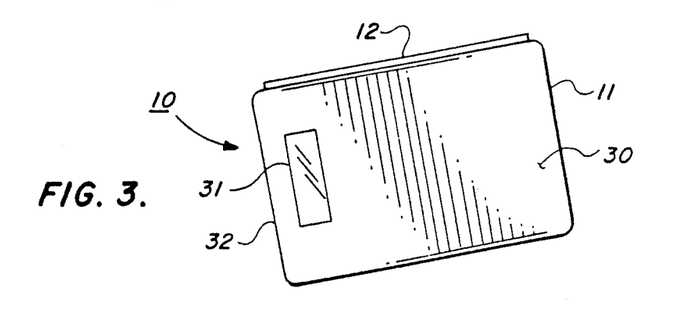
FIG. 3 is an isometric view of the device of FIG. 1 showing the top exterior surface in the closed position.

As shown in FIGS. 2-7, and particularly FIGS. 2-3, housing 11 has an exterior bottom surface 36. A recessed reset button 35 and a first data-link assembly 37 are disposed in rear housing 11. Data-link assembly 37 transmits and receives signals in a direction perpendicular to bottom surface 36.

The generally rectangular exterior top surface 30 of housing 11 having a solar energy collector 31 positioned adjacent short side 32 is shown in FIG. 3.

Figure 4:
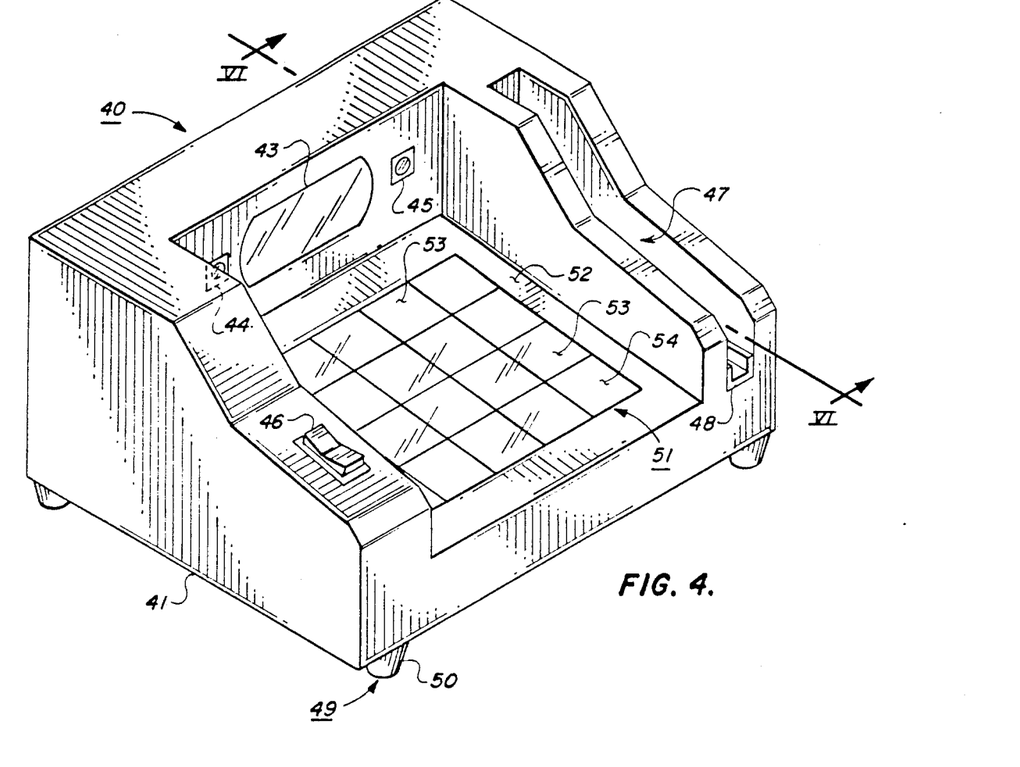
FIG. 4 is an isometric view of a device embodying a collection station for use with the tabulation device of FIG. 1.

In FIG. 4, a collection station device or "collector" embodying the present invention is identified by the general reference 40. Each collector 40 comprises a generally rectangular housing 41 having a sloping front panel 52 into which is mounted an alpha-numeric display 53 for displaying a variety of status messages, a red indicating light 45 which when illuminated indicates that data is being transferred between tabulation device 10 and collection station device 40, a green indicating light 44 which when illuminated indicates that either collection station device 40 is ready to accept input from tabulation device 10 or that tabulation device 10 is ready to be removed from collection station device 40, and a main power switch 46 which preselectively controls power applied to collection station device 40. An insertion slot 47 comprising a narrow slot having its open end facing upwards is disposed in the top surface of housing 41 adjacent one end thereof. Slot 47 is provided with sufficient width to accommodate the PDC card 10 when card 10 is in the folded position. Slot 47 extends inwardly from the front of housing 41 and increases in length and depth until its length equals the longest dimension of PDC card 10 when card 10 is in a folded position and the depth of slot 47 equals the dimension of side 32. A Teflon$^R$ guide 48 is mounted at the bottom of the entry to slot 47 to decrease the physical wear on housing 11 and enhance the ease of passing card 10 into and out of slot 47. Housing 41 is supported by a non-skid support assembly 49 having a plurality of non-skid feet 50 operatively associated therewith. Disposed intermediate power switch 46 and card slot 47 is keyboard shelf 52. Shelf 52 supports keyboard assembly 51 which contains a plurality of discrete keys 53, at least one of which, key 54, is designated "STATUS".

Figure 5:
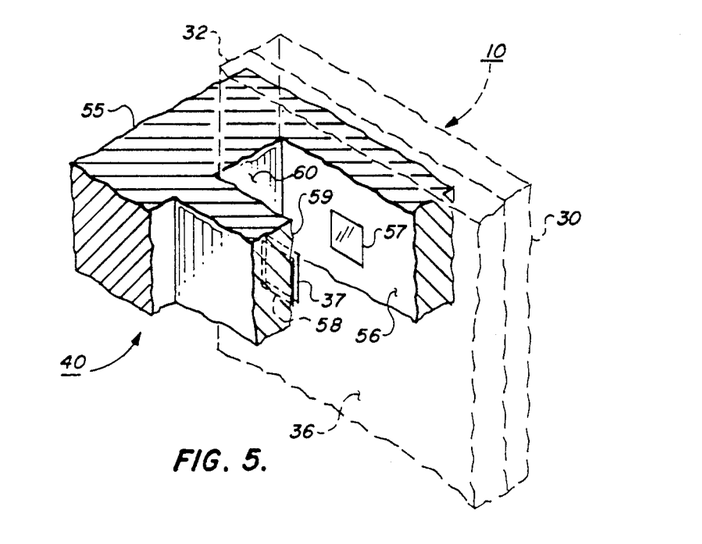
FIG. 5 is a detailed phantom view of the data-link assembly of the device of FIG. 4 as mated with the device of FIG. 1.

FIG. 5 shows the position of first data-link assembly 37 relative to second data-link assembly 55 which is mounted within collection station device 40 at the time the tabulation device 10 is fully inserted into slot 47. Data-link assembly 55 comprises a U-shaped assembly adapted to permit side 32 of housing 11 to enter into a recess in data-link assembly 55, thereby permitting portions of data-link assembly 55 to extend over both top surface 30 and bottom surface 36 of housing 11. On the interior side 56 of data-link assembly 55 adjacent to top surface 30 is constant energized optical source 57. Constant optical source 57 is energized when power switch 46 is in the "ON" position and emits its output in a path perpendicular to surface 56. Opposite from optical source 57 and in direct alignment therewith is optical transceiver 58 which is located on surface 59. Surfaces 56 and 59 are disposed in generally parallel planes. In operation, the sensitive axis of optical transceiver 58 is perpendicular to surface 59.

When tabulating device 10 is fully inserted into slot 47, side 32 of housing 11 will contact seating surface 60 of data-link assembly 55. Top surface 30 and bottom surface 36 of housing 11 are parallel to surfaces 56 and 59 respectively of the second data-link assembly 55. Furthermore, when tabulating device 10 is fully inserted into slot 47, optical transceivers 37 and 58 are in direct alignment with each other. The distance between the planes of surfaces 56 and 59 of second data-link assembly 55 is at least equal to the width of slot 47 in collector 40.

Figure 6:
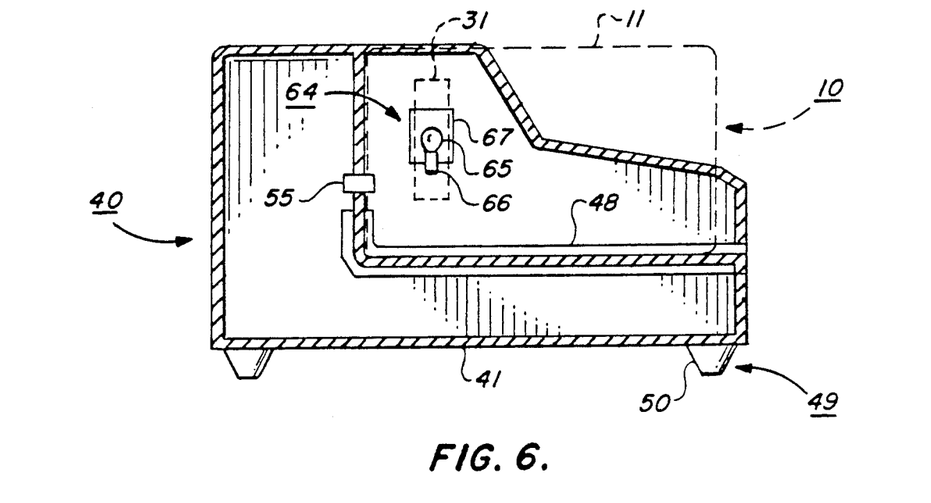
FIG. 6 is a cross-section of the device of FIG. 4 taken along line 6—6 thereof.

Referring now to FIG. 6, collection station device 40 further comprises an illumination assembly 64. In one embodiment, illumination assembly 64 comprises a lamp 65, a socket 66 and a reflective infrared emitter assembly 67. Infrared emitter assembly 67 is disposed within housing 41 adjacent data-link assembly 55 and, when tabulation device 10 is fully inserted into slot 47, is in direct parallel alignment to solar energy collector 31 located in top surface 30 of housing 11.

Figure 7:
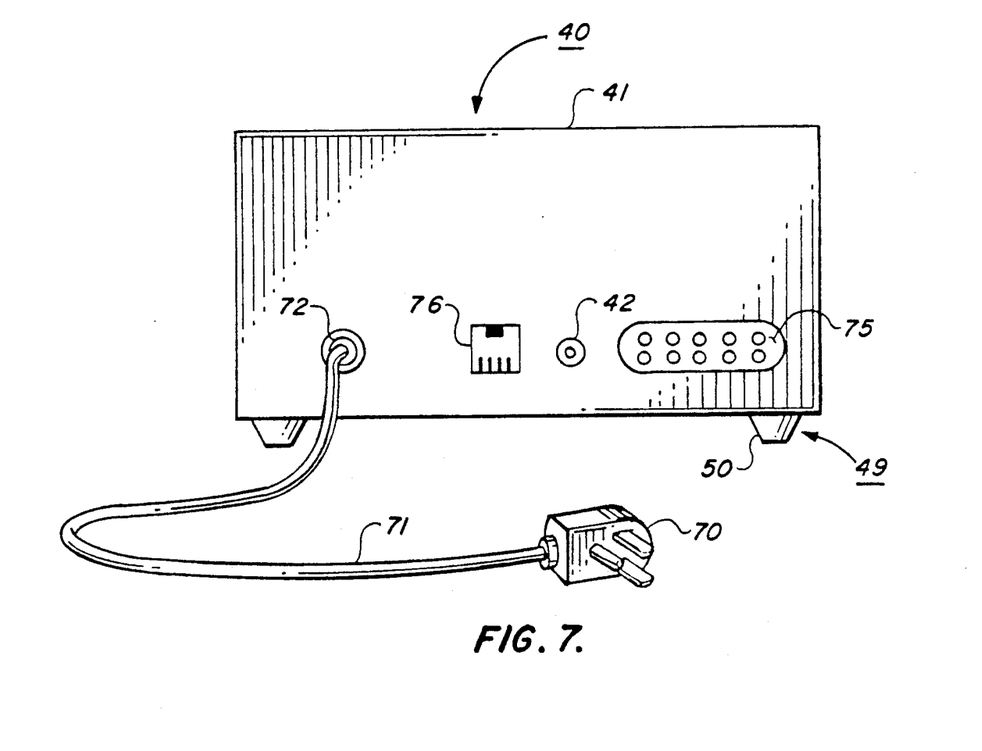
FIG. 7 is a rear view of the device of FIG. 4.

FIG. 7 shows collector 40 in operative association with a power supply adapter assembly 70. Assembly 70 provides power to collector 40 through power supply cord 71 which is connected to device 40 at the rear of housing 41. Supply cord 71 is preferably secured to housing 41 by a suitable cord restraint 72. Collection station device 40 further includes a reset switch 42 and two data output ports 75 and 76 on the rear side of housing 41. Reset switch 42 permits collection station device 40 to be reset to the entry mode when desired or required. Accumulated data is output to other devices in parallel fashion through output port 75 and in serial fashion through output port 76 depending on the exigencies of the receiving device.

In one practice of the present invention, the operator opens the housing 11 of tabulation device 10, and presses "START" keypad 18 to instruct tabulation device 10 to initiate the user entry sequence. Tabulation device 10 prompts the individual on alpha-numeric display 14 to enter the "operator identification code". The individual enters the appropriate data utilizing the multifunction keypads of keypad assembly 16. Keypads "TOGGLE RED" 24 and "TOGGLE BLUE" 25 of keypad assembly 16 may be used to alter the designation of the multifunction keypads on keypad assembly 16. Whenever keypad "TOGGLE RED" 24 is pressed, alphanumeric display 14 indicates the multifunction keypads of keypad assembly 16 are in the "TOGGLE RED" state which permits the multifunctional keypads of keypad assembly 16 to assume the function designated in the upper left corner of each multifunctional keypad. The "TOGGLE BLUE" keypad performs a like function in that after pressing the "TOGGLE BLUE" keypad, the multifunctional keypads will assume the functions designated in the upper right corner and alphanumeric display 14 will show that the "TOGGLE BLUE" multifunctional keypad designations have been selected. The other keypads contained within keypad assembly 16 which have only one value shown do not have an alternate toggle function. After the data for the "operator identification code" is entered, the operator then presses keypad "ENTER" 17.

In a like manner, tabulation device 10 prompts by means of the alphanumeric display 14 the entry of "the department identification code", "the function code", "the job/device code" and like parameters preselected to produce the desired data record. In those instances where a given parameter such as "job/device code" is not required to create a given report, the operator need only press "ENTER" 17 on keypad assembly 16 when prompted for such information. The term used herein to identify the aggregate of entered information which may be composed of "operator identification code", "department identification code", "function code", "job/device code" and the like is "tfunction".

If, during the process of entering any of the aforementioned data, the reporting employee, that is, the operator, makes an error, the individual need only press the "START" keypad 18 to abort the incorrect data and return to the beginning of the entry sequence. The operator can then enter the correct data in the prompted sequence.

The information entered by the operator is stored in the internal memory contained within tabulation device 10. Time accrual against the entered tfunction begins when the "ENTER" keypad 17 is pressed after the individual is prompted for "job/device" data.

Tabulation device 10 continues to accrue time expended on the current tfunction until the operator presses the "FUNCTION" keypad 19. Tabulation device device 10 then records automatically into its internal memory the time of termination for the previously encoded tfunction, and prompts the individual to enter a new "function code", "job/device code" and the like by means of alphanumeric display 14. Upon entry of the new codes, time accrual begins for the new tfunction. For this new tfunction, the "operator identification code" and "department code" are identical to the "operator identification code" and "department code" used for the previous tfunction.

If, during the course of a tfunction, the individual needs to break for lunch, go to the bathroom, or a like non-chargeable activity, the individual presses the "OVERHEAD" keypad 20. Tabulation device 10 will then suspend the time being accrued for the current tfunction and will accrue time against a pre-designated code for overhead time. When the individual has completed his non-productive diversion, the "OVERHEAD" keypad 20 is again pressed which causes tabulation device 10 to suspend its time accrual against the overhead tfunction, and resuming time accrual against the pre-interruption tfunction.

If, during the course of the workday, the individual realizes that some component of the current tfunction is in error, he/she presses "ERROR" keypad 23. The tfunction for which time was erroneously being accrued is identified in the data base of the PDC card 10 as being "in error", and the operator is then prompted by means of alphanumeric display 14 to enter the correct tfunction data. Thereupon time accrual for the corrected tfunction will begin.

At any time during the workday a supervisor or the individual worker assigned a given tabulation device 10 may determine the accumulated data related to the current tfunction by pressing the "RECALL" keypad 22. This causes the next field of information for the current tfunction to be sequentially displayed, for instance, "department code", "function code", "job/device code", "start time", and "elapsed time". Tabulation device 10 does not suspend time accrual for the current tfunction during the recall process. Pressing the "RECALL" keypad 22 when "elapsed time" is displayed results in the alphanumeric display 14 returning to its "off" status.

At the end of the work day, the individual will press the "END" keypad 21. This action ends the time accrual against the current tfunction. The tabulation device 10 is now ready for data download.

Prior to the download sequence, however, collection station 40 will be connected to a suitable power source through power supply cord 71. Collection station 40 is enabled for downloading by moving power switch 46 from the "OFF" to the "ON" position. After internal diagnostics are run, collection station 40 displays the message "ENTER CARD" on alphanumeric display 43. Simultaneously therewith, green indicating light 44 illuminates to indicate that collection station 40 is ready to accept a tabulation device 10 for data download.

Downloading of data from the PDC card or tabulation device 10 to collection device 40 is accomplished by folding tabulation device 10, and inserting tabulation device 10 into slot 47 of collection device 40. As the housing 11 of tabulation device 10 slides into slot 47, side 32 of housing 11 interrupts the continuous optical beam passing between constant optical source 57 and optical transceiver 58, thereby informing collection station 40 that a tabulation device 10 has been inserted. Collection station 40 then illuminates lamp 65 to provide a power boost to tabulation device 10 from solar energy collector 31. Collection station 40 then attempts to establish a data link to tabulation device 10 through second data link assembly 55. If collection station 40 is unable to establish such a data link within a predetermined period of time, the operator is prompted via alphanumeric display 43 on collection station 40 to remove and re-enter the PDC card 10. After collection station 40 establishes a data link with tabulation device 10, collection station 40 displays on alphanumeric display 43 the message "WAIT", extinguishes green indicating light 44, and illuminates red indicating light 45 to indicate to the individual that a data link is in progress and that tabulation device 10 should not be disturbed. Collection station 40 then instructs tabulation device 10 to download the contents of its internal memory to collection station 40 through data link assembly 55. Once the data from tabulation device 10 has been received and acknowledged by collection station 40, collection station 40 instructs the tabulation device 10 to erase the contents of its internal memory whereupon tabulation device 10 is ready for further use. Collection station 40 then displays the message "REMOVE CARD" on alphanumeric display 43, extinguishes red indicating light 45, and illuminates green indicating light 44 informing the individual that tabulation device 10 may be removed and re-folded. Once device 10 is withdrawn from slot 47 and collection station 40 senses via data link assembly 55 and constant optical source 57 that the tabulation device 10 has been removed, collection station 40 will automatically display the message "INSERT CARD" on alphanumeric display 43 which prompts the next individual to insert his/her tabulation device 10 to repeat the download sequence.

Collection station 40 periodically transmits via data output port 75 or data output port 76 the data it has accumulated from several PDC cards 10, to other computational devices from which permanent hard copies of the data can be produced in a conventional fashion.

As is apparent from the foregoing, the hardware utilized in creating the Peripheral Data Collection means or PDC card 10 of the present invention essentially consists of a microcontroller (CPU), a keyboard, a power source, a display, infrared communication circuitry, and specified interface section.

In one embodiment of the present invention, a preferred CPU is the MC68HC11E9 microcontroller manufactured by Motorola, Inc. or its equivalent, operated in single chip mode. It is noted that several variations of this microcontroller exist, each with a preselected amount of ROM, RAM, ports, and like features, the intent herein being to equip PDC card 10 with whatever version of the CPU that meets the exigencies of the given installation. The Motorola CPU MC68HC11E9, for instance, contains 512 bytes of RAM and 12K bytes of PROM which is suitable for most applications. The microcontroller is preferably capable of running at a maximum crystal rate of 8.4 mhz, although power is conserved when the PDC is operated at a crystal rate of 2.1 mhz which corresponds to an internal (to the CPU) rate of 500khz.

The keyboard used herewith is a standard vendor part which interfaces to the PDC through ports E and A on the CPU. The keyboard interface is interrupt driven.

The display used herein is preferrably an "intelligent" model, that is, the display incorporates its own microcontroller which is responsible for interpreting command requests from the controlling CPU, and for scanning the liquid crystal display elements. Alternatively, the unit may incorporate an ADG designed display if reduced display power consumption is a factor.

The proprietary software employed herewith consists of several function blocks which are: the routine main; the real time clock; the user interface; the keyboard interface; the display interface; the collector interface; and the entry data base. The software was written using an assembler and simulator from Avocet Incorporated, Rockport, Me. The software is copyrighted and microfische thereof are appended hereto.

Testing methods include manually applying stimulus to CPU ports during simulation, and the creation of "C" programs to apply stimulus during the course of simulations. The "C" used was "Turbo C", from Borland International.

The system of the present invention is interrupt driven, that is, it is essentially asleep until some event wakes it up. Upon system reset, at completion of manufacture is the only time this should ever be required, the system executes the INIT routine, followed by the routine MAIN. MAIN contains one relevant instruction—WAIT. The WAIT instruction puts the CPU into a low power mode, waiting for an interrupt of some sort. In this system the interrupt may come from the real time clock, the keyboard, or the serial interface which, as previously described enables PDC/collector communications.

An additional facility of the serial port on the microprocessor is used to conserve power. This mechanism is referred to as a "wake" function. The serial port is "put to sleep", in the "address mark wake up mode" and the serial port will not issue an interrupt to the CPU core unless a serial character is received that has its most significant bit set (the serial port circuitry is essentially acting as a character filter, preventing spurious interrupts to that CPU, for those cases where the PDC may be in a noisy environment).

The software structure is modular, with well-defined protocols for inter-routine communication.

The real time clock is implemented using Timer Output Compare Function 2 of the MC68HC11E9 microcontroller. This timer compare function is set up (by the routine INIT) so that the CPU is interrupted every second. On each of these interrupts, the routine RTCUD is called, which updates the locations used to track time. One location is reserved for seconds, one for minutes, and one for hours. Time is based on a 24 hour day.

The keyboard consists of an array of keys 4 wide by 5 tall. As previously described, keyboard functions include START, ENTER, FUNCTION, SHIFT1, SHIFT2, END, OVERHEAD, ERROR, RECALL, and data entry keys (numerals 0-9, and letters A-Z).

When the operator presses a key, an interrupt to the CPU is generated, and the routine KEYINT is called. KEYINT calls TIMOUT to wait for keyboard debounce, (initially 20 msec). After debounce, KEYINT calls GETKEY. GETKEY figures out which physical key on the keyboard was pressed, and then indexes into a table to get the value for the key. Using the table method allows for easy remapping of keys. If GETKEY was successful (an example of an error is when more than one key is being pressed at a time), KEYINT then calls KEYPROC to process the keyboard press. Otherwise, KEYINT calls KEYREL, which waits until all keys are released, then exits, at which time the processor returns to the WAIT mode.

KEYPROC, after being called by KEYINT, first checks to see if the key that was pressed was a function key. Function keys are identified by the fact that the high order bit of their 8 bit key code is a "1". If the key is a function key, the routine FNCPROC is called. If the key hit was not a function key, and the system is in entry mode (i.e. the operator is entering data), the routine DPROC (data process) is called. If a non-function key is pressed when not in entry mode, the routine KEYPROC exits to KEYINT, where KEYREL is called for a key release check and debounce. The system then returns to the WAIT state. To the operator, the system will appear to have not responded at all.

DPROC stores the character typed into a buffer, and displays the typed character on the display. The buffer pointer is adjusted also.

FNCPROC determines the FUNCTION key pressed, and calls the appropriate function routine. The function routines are START, ENTER, FUNCTION, SHIFT1, SHIFT2, OVERHEAD, END, ERROR, and RECALL. The functions ENTER, SHIFT1, and SHIFT2 will not be recognized (i.e., pressing the key has no effect) if the PDC is not in entry mode. The PDC is placed into entry mode by the START or FUNCTION routines (entered by pressing the associated key). The keys/routines END, FUNCTION, ERROR, and RECALL will not be active while the system is in entry mode and these keys if pressed during the entry sequence, will appear to be inoperable to the user.

All function routines, when entered, change the state of the system. They write messages to the display, make entries into the user data base, and set of reset flags indicating the current state of the system. Associated with the function routines are many peripheral routines used to execute specific tasks.

The display is controlled by the routines DISHAN, DISOFF, DISON, DISCLR, DISCFD, DISCWR, and DISMWR. Routines that need to modify the display load registers to indicate the desired function, and then call DISHAN, which then calls the appropriate routine to execute the display related function. For the purposes of software debug, all of the display routines, except DISHAN have a "twin", named "tfunction" (for example TDISOFF). The function will simulate the display operation in RAM. The actual hardware routines to drive the real display are not yet customized to the display device utilized. Display routines and their functions which are employable herewith include:

DISOFF—which turns off the display; DISON—which turns on the display; DISCLR—which clears all fields of the display; DISCFD—which clears a specific field of the display; DISCWR—which writes a character to a specific field of the display; and DISMWR—which writes a message to a specific field of the display.

Approximately 39 routines are responsible for controlling PDC/Collector communications. These may be subdivided into the following groups: SCI interrupt processing/sensing and maintaining connection with Collector; command decode and command execution; transmit control; error monitoring; and watchdog timer.

The SCI is set up for 8 bit transfers even though the MC68HC11E9 is capable of using a 9 bit data unit.

The communication process employed herein employs the following functions and routines. First, the PDC must sense a specific set of characters, in the correct sequence, to conclude that it is in a collection station (the Collector). After the two systems are connected (or docked), communications are on a "packet" basis. A packet is basically a "template" or "shell" of ascii characters defining "signposts" within a block of information being transferred between the two systems. Packets are acknowledged if received correctly with an ACK ascii character, otherwise a NAK (Negative Acknowledge) is returned. A NAK results in the packet being re-sent from the transmitting system to the receiving system. The packet used for PDC/Collector communications has the following structure:

—byte 1=ascii SOH (Start Of Header). This identifies the start of a packet.
—byte 2=command code if packet is from Collector to PDC, may or may not contain relevant information if from PDC to Collector.
—byte 3=ascii STX (Start of TeXt). This identifies the start of the data within the packet.
—byte 4—byte x=data. The number of bytes of data is command dependent.
—byte (x+1)=ETX (End of TeXt). This identifies the end of the data portion of the packet.
—byte (x+2)=checksum of packet contents. The checksum in this byte is compared to a computed checksum of all the bytes to this byte as an error detection mechanism.
—byte (x+3)=00. This is a blank byte, in case a more elaborate error detection scheme is required (ie, so the basic packet structure will not have to be changed —only the error check algorithm will have to be changed).
—byte (x+4)=EOT (End Of Transmission). Indicates the end of the packet.

Note that an escape character is supported, for those cases where binary data may by chance match a function or packet control code (such as with checksums).

The PDC is driven by the Collector. It receives packets from the Collector, does an error check on the packets, and then (assuming error free reception of the packet) processes the commands contained within the packets. Following is a list of the commands supported, the routines that support the following commands having the same name as the commands themselves:

- —SCIIDUD—Initialize a dump of the user data base. This command will send a packet containing the first user data base entry to the Collector. An ACK from the Collector results in the next entry being sent to the Collector, and a NAK results in a resend of the entry. For the packets sent to the Collector, the byte between SOH and STX contains the entry number (in binary). An entry number of FF (hex) indicates that this is the last entry (and therefore the last packet of the dump of the user data base).
- —SCIEX—Execute delayed execute command. Commands are of two types—"normal" and "delayed execute". A "normal" command is executed immediately, after an error check is performed on the packet containing the command. For certain critical operations that will affect the user data base, the command is set up as a delayed execute command. A delayed execute command is not executed immediately—only a flag is set to identify and indicate that a delayed execute command is pending. At this point the Collector may poll the PDC to check the identity of the delayed execute command, and then, if it is correct, send the PDC the SCIEX command, resulting in command execution. Unless indicated otherwise, commands in this list are "normal execute" commands.
- —SCIDSE—Dump Specific Entry of user data base. The Collector may request a specific entry of the user data base with this command, if desired.
- —SCIDTM—Dump TiMe. This command sends a packet to the Collector containing the time. Currently the time packet contains a byte for hours, minutes, and seconds.
- —SCISTM—Set TiMe. This command, as the name implies, allows the Collector to set the time of the real time clock on the PDC.
- —SCIRML—Read Memory Location. A general purpose command that allows the Collector to read any memory location within the address space of the PDC.
- —SCIDNU—Dump Non-user Data. This will dump to the Collector a packet containing information such as the serial number of the card, software revision of the code on the card, and error information (see later discussion on errors).
- —SCICEH—Command ECHO. Echoes to the Collector the current delayed execute command.
- —SCICDB—Clear Data Base. Clears the user data base on the PDC. This is a delayed execute command. The entire sequence used to execute this command is to send to the PDC the SCICDB command, followed by a SCICEH command (which echoes the SCICDB command to the Collector). The Collector then sends the SCIEX command to the PDC, resulting in the internal user data base to be erased.
- —SCICOI—Clear Operator ID. Clears the operator identification within the card. Delayed execute command.
- —SCICED—Clear internal error data base. Delayed execute command.
- —SCIPEP—Program internal EEPROM location. Currently not implemented.
- —SCITCN—Terminate Connection. Tells the PDC to undock from the Collector, and go to sleep (ie. enter the WAIT mode).
- —SCIDOD—Dump Operator identification. Sends a packet to the Collector containing the operator identification.

The PDC/ Collector connection sequence operates in the following manner. As earlier mentioned, the SCI (Serial Communications Interface) on the microprocessor is set up in the "wake on address mark" mode. For this first iteration of product, the Collector is constantly sending the character "AA" out of the infrared transmitter. When the PDC is placed in the collection slot, this character (since the most significant bit is "1") will wake up the SCI, and thus generate an interrupt to the CPU. This results in the routine SCIINT being called. This routine first checks to see if the PDC is connected to the Collector and if it is not, will call the routine SCICONN to aid in the connection process.

SCICONN in turn calls SCIWDOG to set up a watchdog timer. The watchdog will shut down the SCI forcibly after two seconds if the SCI is not shut down normally as by a SCITCN command. SCICONN next calls SCIGCH, which retrieves the character from the SCI port. If no errors are detected at this point (such as overrun or framing), the character is tested to see if it is "AA". If so, a flag is set to indicate that the first part of the connect sequence is complete, the transmitter is turned on, and SCIPCHR is called to echo the "AA" character to the Collector. If an error is detected, SCICONN returns to SCIINT, and the system goes to sleep. It is anticipated that while the PDC is sliding into the Collector, many spurious errors may occur.

If, within SCICONN, the character received is not "AA", a check is done to see if "AA" was previously received. If so, the current character is checked to see if it is "A5". If it is, "A5" is echoed to the Collector, and a flag is set indicating the PDC and Collector are docked. If this character is not "A5", the routine SCIAERR is called to record this type of error.

If, when the PDC and Collector are not connected, a character with its MSB set other than "AA" is received, SCICONN calls SCIIERR to record a false interrupt, and then SCISD, to shut down the SCI.

After connection, the routine SCIINT no longer calls SCICONN, but instead calls SCIGCH (to get the character from the SCI). If no errors are detected for the byte, SCICPR is called to process the character. If an error is detected, a flag is set to indicate that for the current packet (of which the current byte is a part) an error has been detected. Note that even though an error is detected for the byte, it will not be resolved until the entire packet has been received.

The Command Decode and Execution functions will now be described.

The routine SCICPR processes the characters (other than during the connect sequence) which are received from the Collector. First a check is done to see if the PDC is expecting the reception of an ACK or NAK character. This would be the case if the PDC has sent a packet to the Collector. If the PDC is expecting an ACK or NAK, and the character is an ACK, the flag indicating an ACK or NAK is expected is cleared. If the PDC is dumping the user data base, the routine SCIDUD is called, to send the next user entry. If not, SCICPR exits and the system idles.

If an ACK or NAK is expected, and a non-ACK character is received, which may be a NAK or some other character, the packet for which the non-ACK was received is re-sent.

If the PDC is not expecting an ACK or NAK, SCICPR is responsible for maintaining a CHECKSUM of incoming bytes, storing data bytes within the packet, checking if the bytes are packet control bytes, and, if so, performing the appropriate function.

Upon detection of EOT, SCICPR calls SCIPPRC, to process the packet. SCIPPRC determines if the packet has any errors (dependent on the CHECKSUM and whether any errors were received for any individual bytes), and, if so, sends a NAK to the Collector. If the packet is clean, the routine SCIEXP is called to decode and execute the command.

The routines involved in transmitting information from the PDC SCI to the Collector are SCITON, SCITOFF, SCIPCHR, SCIPSND, and SCIPSTR, of which SCITON turns on the transmitter in the SCI; SCITOFF turns off the transmitter in the SCI; SCIPCHR puts a character to the SCI; SCIPSND constructs and sends a packet out the SCI port to the Collector, this routine generally wraps control information around the data to be sent and sends the control data directly out the SCI port, while calling SCIPSTR to send other data; and SCIPSTR sends a string of contiguous data out the SCI port to the Collector.

A number of SCI routines are responsible for tracking certain types of errors which may occur during communication with the Collector. The routines and the errors they track are:

—SCIAERR which tracks algorithmic errors. This routine is called when the software gets "backed into a corner", or into a state it should never get in—it should get into certain states only if an error exists in the decision path. An example is if the PDC receives an "AA" connect character followed by some other character than "AA" or "A5";

—SCICERR which records the number of invalid command codes received from Collector and the last invalid command code received;

—SCICSER which records the number of times packets have been marked as errored due to incorrect checksums;

—SCIIERR which records the number of false SCI interrupts received (if the PDC is not connected to the Collector, and a character is received that is not "AA" or "A5" but yet has its msb set, the PDC will wake up, and record this as a false interrupt);

—SCINRC which counts number of NAKs (or, more precisely, the number of non-ACKs) received from the Collector (and, therefore, the number of times it was necessary to resend a packet);

—SCINST which counts the number of NAKs sent to the Collector (and, therefore, the number of times a packet was incorrectly received from the Collector); and —SCIXERR which records framing, overrun, and noise errors from the SCI.

The watchdog timer is implemented as part of the Collector/PDC communication code to insure that, if the units become mechanically disconnected after docking has occurred but before the data dump is complete, or if the PDC is somehow "faked" into thinking it is connected, eventually it will be forced to the off state. The routine responsible for setting up the watchdog function is SCIWDOG. It is called by SCICONN (the routine that attempts to connect the PDC to the Collector), and sets up a watchdog interrupt of two seconds. Note that the timeout is adjustable by modifying a value in RAM.

If the timer ever interrupts, the routine SCITOUT is called. This code shuts down the SCI and forces a disconnect from the Collector. Note that if the SCI is currently in the midst of a transmission, SCITOUT will wait for the transmission to complete.

The modules EQUATES and DSTRUCT contain many constant definitions and the definition of how the RAM in the microprocessor is utilized. In terms of user data base, an entry consists of 1 byte used for status information, 16 bytes for department ID, 16 bytes for function ID, 16 bytes for job/device ID, two bytes for start time, and two bytes for end time.

In terms of understanding the code, a good place to start is the routine VECTORS. This defines what code is executed upon various sources of interrupt.

The hardware involved in the operation of the Collector consists of the CPU, keyboard, power, display, memory, and interface sections.

One CPU which performs well herein is the MC68HC11E9 microcontroller manufactured by Motorola, Inc. Several other appropriate microcontrollers are commercially available from Intel, Fairchild, Texas Instruments, National Semi-Conductor and the like, each with varying amounts of ROM, RAM, ports, etc. In a preferred practice hereof, the Collector will use this microprocessor running in expanded mode. 256K of external RAM is provided for user data base storage.

The keyboard is a standard vendor part which interfaces to the Collector through ports E and A on the CPU. The keyboard interface is preferably interrupt driven.

The display is an "intelligent" model. In other words, the display incorporates its own microcontroller that is responsible for interpreting command requests from the controlling CPU, and for scanning the liquid crystal display elements.

A serial port is provided for host communications. The means of communicating to the PDC is through an infrared emitter and detector attached to port D of the microprocessor.

Power is supplied to the system by an AC derived supply.

The software for the Collector is such that the Collector appears to be a pass through port that allows the host computer and PDC to communicate directly.

Upon reset, the routine INIT is executed, which sets up the serial ports. Then the routine PTHRU is entered, which just moves characters from one serial port connected to the PDC to the other connected to the host.

For this scheme, the host has to continuously poll the Collector to detect the presence of a PDC in the Collector.

From the foregoing, it is readily apparent that means and methods have been herein described and illustrated which fulfill all of the aforesaid objectives in a remarkably unexpected fashion. It is of course understood that such modifications, alterations, and adaptations as may readily occur to the artisan confronted with this disclosure are intended within the spirit of the present invention which is limited only by the scope of the claims appended hereto.

Accordingly, what is claimed is:

1. A system for recording in real-time units-of-work, said units-of-work representing the increment of time an employee spends at a job related function and a job related device or overhead activity, said time being associated with a unique operator identification and department-identification, and making a permanent record thereof, comprising:

a portable data collection card, said card including keyboard means having a plurality of field key means and numerical key means; said field key means including a "START" key means to indicate the start of the unit-of-work collection process, "OHD" key means to indicate non-specific work, and "END" key means to indicate the end of the unit-of-work collection process, a first and second toggle key means to activate respective first and second keyboard mappings; control means, activatable by said "START", "OHD" and "END" key means, to start the collection of units-of-work, to suspend the collection of units-of-work, and to end the collection of units-of-work, respectively; memory means for storing said collected units-of-work; display means for displaying time data and instructional prompts; a first power source for transmitting data to a collection station; a second power source for energizing said control means; a bi-directional optical interface for downloading real-time units-of-work to said collection station;

said collection station having keyboard means having a plurality of collector field key means and numerical key means; collection station control means for controlling the operation of the collection station; said collector field key means including a "STATUS" key means for actuating the collection station control means to determine the identity and magnitude of information currently residing in said collection station; memory means for storing data; display means for displaying data; a power source for energizing the collection station control means; bi-directional optical interface means for receiving data from the portable data collection card; and means for communicating said receiving data from said collection station interface to a main computer.

2. A system according to claim 1 in which said control means, in response to activation of said "START" key means, instructs said display means to display an "OPERATOR-ID" message and a "REAL-TIME" message; and said portable data collection card contains additional field key means for entering operator-identification information, job function code information, job device code information, and productivity information into said memory means of said portable data collection card.

3. A system according to claim 2 in which said card control means, in response to activation of said "OHD" key means, instructs said display means to display an "OVERHEAD" message indicating that real-time units are being accumulated for overhead activities; and upon reactivation of said "OHD" key means, said card control means stores accumulated overhead time units in said memory means and resumes the previous job-function/job-device unit-of-work collection process.

4. A system according to claim 3 in which said portable data collection card further comprises an "ERROR" key means for instructing the card control means to delete an incorrect entry.

5. A system according to claim 4 in which said portable data collection card further comprises a "RECALL" key means for instructing said display means to display unit-of-work sub-components including operator-id information, department-id information, job function information, job-device information, read-start time information, and elapsed time.

6. A system according to claim 1 in which said collection station further comprises: an on-off switch means for initiating diagnostics and displaying a message to "ENTER CARD", a green light means to indicate when lighted that portable data collection cards can be down-loaded to the collection station; a red light means to indicate when lighted that a successful down-load optical data link has been established; a "REMOVE CARD" display means for indicating when data from a data collection card have been down-loaded to said collection station; and an "INSERT CARD" display means for indicating the removal of the portable data collection card from the interface of said collection station.

7. A system according to claim 6 in which said collection station further comprises a parallel and a serial port which, when initiated by program instruction, loads the units-of-work data to a central CPU of a peripheral device.

* * * * *